Patented Dec. 30, 1941

2,267,739

UNITED STATES PATENT OFFICE 2,267,739

COMPOSITION OF MATTER FOR TREATING SKIN DISEASES

Adolph J. Kemppe, Santa Rosa, Calif., assignor of one-half to George B. White, San Francisco, Calif.

No Drawing. Application April 5, 1938, Serial No. 200,119

6 Claims. (Cl. 167—58)

This invention relates to a composition of matter for treating skin diseases and particularly eczema.

There are skin diseases which are very hard to treat and which also are the cause of great inconvenience and pain to persons suffering from the same. For instance eczema is one of the most difficult diseases to treat and often proves most obstinate and rebellious even in the hands of experts.

The symptoms of such skin diseases are similar in a general way, namely there is a congestion of the skin with swelling and increase of local temperature, then there is fluid exudation into the tissues with the formation of vesicles and pustules, or with discharge upon the surface, resulting in scabs and scales, then plastic exudation producing papules, patches of infiltration and thickening, and at all times subjective sensations of itching, smarting and burning.

In external treatments of skin diseases there are in use various lotions, ointments, paints and powders and the like, which respectively are applied at various stages of the disease. But in all such preparations heretofore used it was necessary to have repeated treatments lasting for weeks and sometimes months or longer. Also in preparations heretofore used the most beneficial and quicker acting preparations were irritating to the skin, and lost effectiveness, and had to be replaced at short intervals, at each replacement renewing the painful irritation.

It is an object of this invention to provide a composition of matter and a process which by surface application will stop pain and itching almost immediately and which will react continuously for a protracted period of time, simultaneously drying and disinfecting the diseased skin, and thus will terminate the local cause of skin disease without scabs, or scars.

Another object of this invention is to provide a compound and process whereby a surface anesthetic, a healing substance, and a disinfecting penetrating and drying substance are so applied and united that each ingredient protracts the action of the others, and wherein said substances act simultaneously upon the diseased surface which results in continued healing in a manner that is not accomplished by separate application of the ingredients of said composition.

A further object of this invention is to provide a composition of matter and process wherein the ingredients of the composition of matter freshly combined and applied to the diseased surface will remain active for a length of time sufficient to completely heal the average skin eruption due to local causes.

In carrying out my invention I make use of a composition of matter which consists of zinc-oxide, orthoform, and eugenol. The zinc oxide is a very fine, amorphous powder, free from gritty particles. The orthoform is a surface anesthetic, also in powder form. Both of these substances should be used in form thoroughly dry and inert. Eugenol is a liquid phenol, which is slightly soluble in water, but is miscible with alcohol, chloroform, ether and with fixed oils.

First the zinc oxide and the orthoform are mixed together in a desired proportion, which may be about equal parts of each, although the compound works successfully with as low as one part of orthoform to four parts of zinc oxide. Then sufficient quantity of eugenol is added to the mixture of powders to form a paste or creamy consistency without free liquid.

The powders as well as eugenol should be kept hermetically sealed, even preferably in amber glass or the like container to protect them both from oxidation and light rays.

The treatment must be preferably so applied that the said ingredients are combined freshly just before placing the composition of matter on the diseased surface. The zinc oxide and the orthoform, the dry powder ingredients may be mixed separately and kept in such conditions that eugenol is added and mixed in just before the composition of matter is applied to the diseased parts.

While the above composition of matter was found beneficial in various types of eczema, it was particularly effective in the treatment of cases of acute dermititis, such as poison ivy, or poison oak dermititis. In cases heretofore treated one application of said composition of matter was sufficient to entirely eliminate the inflamed area.

In clinical cases heretofore the application of the paste to the infected surface immediately alleviated the pain, or itching, or burning. The paste is left on the infected part, and experiments show that the skin dries in less than two days, and in about three or four days there is a desquamation of the infected skin. There is no sign of toxicity in any of the treatments by this composition of matter. The vesicles, papules, and other cutaneous lesions attendant to such skin infections entirely disappear after one treatment by the said composition of matter without leaving any scar, that otherwise frequently result from such lesions.

The beneficial effect of the compound herein described appears to be due to the fact that the individual ingredients when applied freshly and before opportunity of prior oxidation, act together on the infected surface, and their action is protracted so that the composition of matter retains its constant influence and effect on the infected surface. In other words the composition of matter appears to retain its full effectiveness continuously for a comparatively long period.

Having thus described my invention what I now claim and desire to secure by Letters Patent is:

1. A composition of matter for treating skin eruptions consisting of eugenol, zinc oxide, and orthoform.

2. A composition of matter for treating skin eruptions consisting of eugenol, zinc oxide, and orthoform in a creamy mixture.

3. A composition of matter for treating skin eruptions consisting of eugenol, zinc oxide, and orthoform freshly mixed for immediate application.

4. A composition of matter for treating skin diseases consisting a mixture of zinc oxide and orthoform in powder form, and sufficient eugenol for forming a paste without free liquid.

5. A composition of matter for treating skin diseases consisting of hermetically sealed zinc oxide and orthoform powders and eugenol.

6. The method of making a composition of matter for treating skin diseases which consists in thoroughly mixing zinc oxide and orthoform into a dry powder, and just before application forming a paste out of said dry mixture by mixing eugenol into the dry mixture.

ADOLPH J. KEMPPE.